United States Patent [19]

Bacardit

[11] 4,208,951
[45] Jun. 24, 1980

[54] POWER STEERING MECHANISM

[75] Inventor: Juan S. Bacardit, Bacelona, Spain

[73] Assignee: Bendiberica S.A., Barcelona, Spain

[21] Appl. No.: 912,626

[22] Filed: Jun. 5, 1978

[30] Foreign Application Priority Data

Jun. 11, 1977 [ES] Spain ............................. 459710

[51] Int. Cl.$^2$ ............................................. F15B 13/04
[52] U.S. Cl. ............................................. 91/422; 91/375 R
[58] Field of Search ..................... 91/375 A, 375 R, 422

[56] References Cited
U.S. PATENT DOCUMENTS

| | | | |
|---|---|---|---|
| 2,917,079 | 12/1959 | Verbrugge et al. | 91/375 R |
| 3,465,842 | 9/1969 | Hruska | 91/375 A |
| 3,722,368 | 3/1973 | Suzuki | 91/422 |

Primary Examiner—Paul E. Maslousky
Attorney, Agent, or Firm—Paul David Schoenle; Ken C. Decker

[57] ABSTRACT

A power steering mechanism for a vehicle which comprises a housing defining a cavity in which is rotatably mounted a rotary steering control member, with a driving piston connected to a member in the steering gear of the vehicle, the piston separating two pressure chambers of the housing. The driving piston also comprises a bore having an open end through which axially extends a screw-threaded spindle of the rotary steering control member. A disc-shaped distributing chamber is defined in said driving piston, and is coaxial with the spindle. The piston supports a nut element in screw-threaded engagement with said screwthreaded spindle, said nut element being prevented to move axially with respect to the piston, and allowed to rotate within a limited angular range. A star-shaped rotor comprising a central portion from which extends a plurality of radial arms is rotatably mounted in the disc-shaped chamber and separates the latter into a first set and a second set of distributing chambers respectively connected to the first and second pressure chambers of the housing. The disc-shaped rotor is connected in rotation with the nut element, fluid inlet and outlet passages respectively connectible to the high pressure side and the low pressure side of a pressure source being provided in said driving piston to communicate with the disc-shaped chamber through respective openings. The openings cooperate with the arms of the rotor to control distribution of the fluid pressure to the first and second pressure chambers as a function of the relative angular position of the piston and rotor.

5 Claims, 4 Drawing Figures

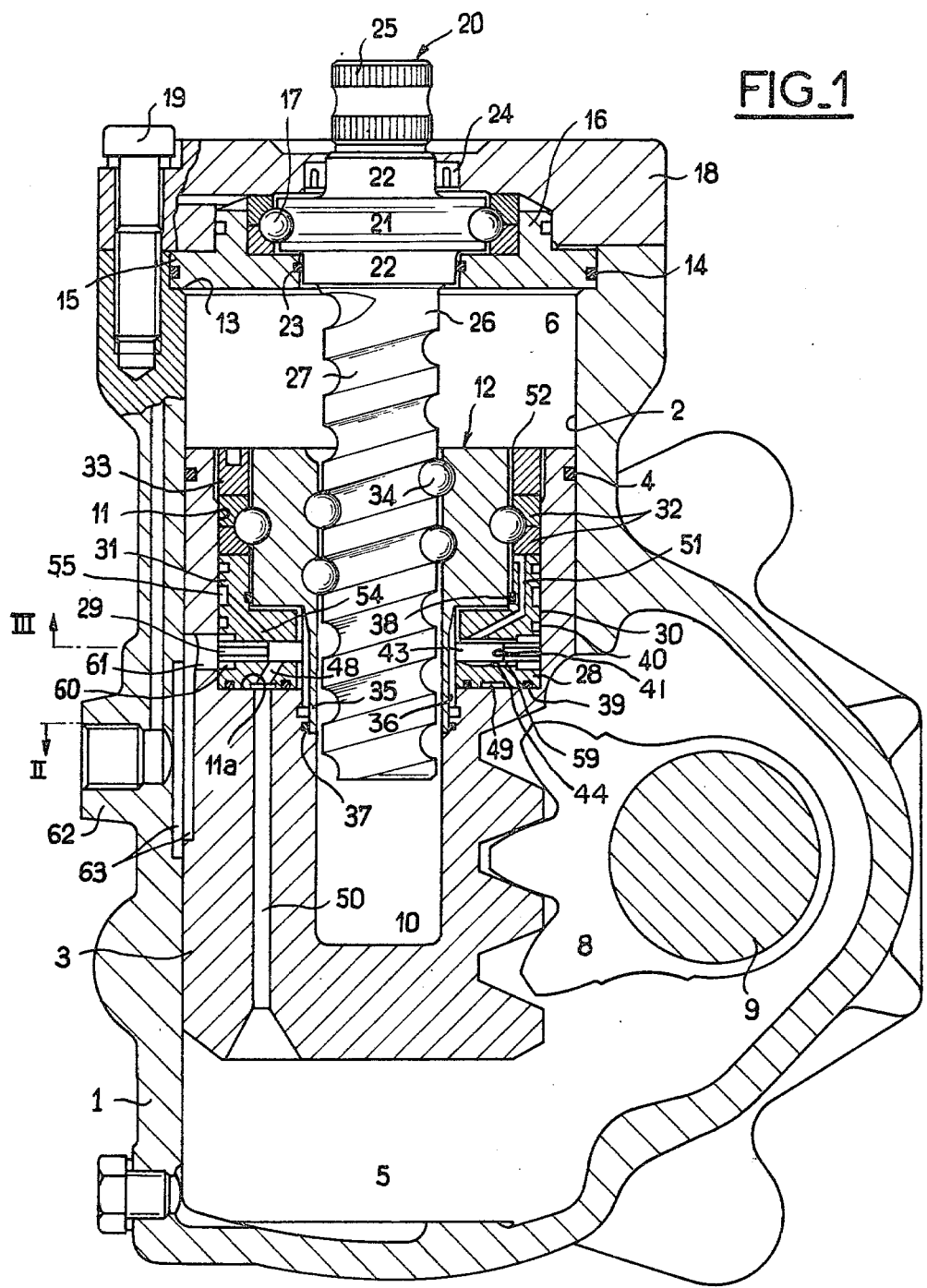
FIG_1

POWER STEERING MECHANISM

The invention relates to a power steering mechanism for a vehicle.

It is known power steering mechanisms of the type comprising a housing inside which is defined a cavity in which is rotatably mounted a rotary steering control member, with a driving piston separating two power chambers in the housing. The driving piston supports a rack in meshing engagement with a sector gear which controls rotation of the pitman arm shaft to activate the steering linkage. The end of the rotary steering control member generally comprises a worm gear which cooperates with a nut of the piston by means of a conventional recirculating ball device. Pressurized fluid is distributed to the power chambers in response to the turning of the steering wheel to the right or to the left, by means of a distribution valve.

In the field of power steering mechanisms of the above-type, it is now a general requirement of vehicle manufacturers, that the overall size of the system be reduced. In particular, it has often been required to reduce the longitudinal distance between the shaft of the sector gear and the end of the spindle to which the steering column is to be connected, as for instance, in trucks having a tilting cab.

The present invention is an endeavour to devise a new solution of this problem by providing a novel construction making it possible to locate the distribution valve with the result that a compact steering box is obtained.

Therefore, according to the invention, it is proposed a power steering mechanism for a vehicle comprising a housing defining a cavity in which is rotatably mounted a rotary steering control member, a driving piston connected to a member in the steering gear of the vehicle, the piston separating two pressure chambers of the housing, said driving piston also comprising a bore having an open end through which axially extends a screwthreaded spindle of the rotary steering control member, characterized in that a disc-shaped distributing chamber is defined in said driving piston, said chamber being coaxial with the spindle, said piston supporting a nut element in screwthreaded engagement with said screwthreaded spindle, said nut element being prevented to move axially with respect to the piston and allowed to rotate within a limited angular range, a star-shaped rotor comprising a central portion from which extends a plurality of radial arms being rotatably mounted in the disc-shaped chamber and separating the latter in a first set and a second set of distributing chambers respectively connected to the first and second pressure chambers of the housing, said disc-shaped rotor being connected in rotation with the nut element, fluid inlet and outlet passages respectively connectible to the high pressure side and the low pressure side of a pressure source being provided in said driving piston to communicate with the disc-shaped chamber through respective openings, said openings cooperating with the arms of the rotor to control distribution of the fluid pressure to the first and second pressure chambers as a function of the relative angular position of the piston and rotor.

According to a preferred embodiment of the invention, the open end of the bore comprises an enlarged portion defining a shoulder, the disc-shaped chamber being formed by the inner space defined in an arrangement comprised of two annular plates and an annular ring between the two plates, said arrangement being fitted in the enlarged portion so that one of the plates is in abutment with said shoulder, the nut element being mounted in said enlarged portion and having one sleeve extension axially projecting in said disc-shaped chamber, said extension being rotatably connected to the star-shaped rotor.

The invention will now be described, by way of example, with reference to the accompanying drawings, wherein:

FIG. 1 is a view in axial section of a steering box having a servopiston serving as a nut for the steering spindle, and a rack for the output sector, the box also containing the distributing valve;

Figure 3:
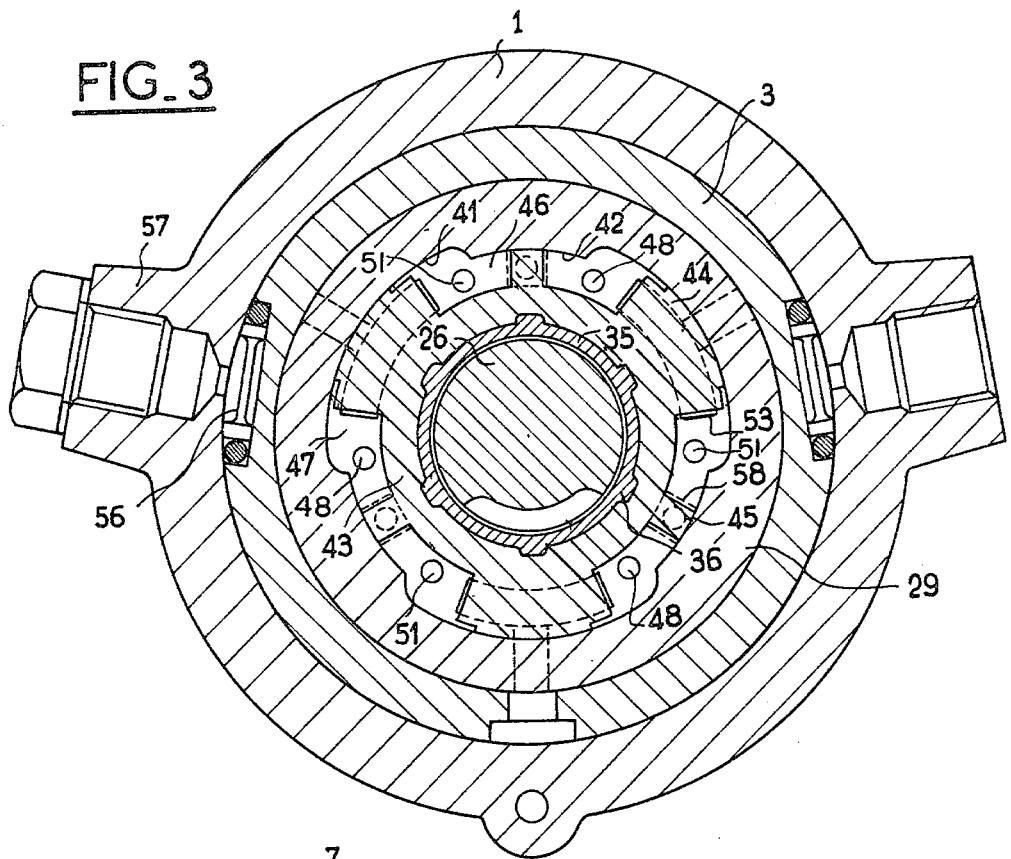
FIG. 3 is a cross-section along the line III—III of FIG. 1 showing the arrangement of the valve system.

A steering box comprises a housing 1 having an internally cylindrical shape 2. A piston 3 guided by conventional means (not shown) is slidable freely axially but non rotatably in the housing. Piston 3 is sealed hermetically by sealing means, as 4, so as to define two working chambers 5, 6. On its outside surface, the piston 3 has rack teeth 7 which mesh with a gear sector or quadrant 8 forming part of the steering box output shaft 9. Extending through the piston 3 is an axial bore 10 which is closed at one end (at the bottom in FIG. 1); at its other end the bore 10 widens so as to define a large diameter portion with an annular shoulder 11a therebetween. Enlarged portion 11 receives a valve nut device 12 to be described hereinafter.

The mouthpiece of the box has an internal steplike seat 13 in which a plate 15 engages hermetically with the interposition of a ring seal 14; extending from the outside surface of the plate 15 is a shoulder or ridge 16 which forms a seat for a ball bearing 17. The position of the whole system is secured by means of a cover 18 secured by screws 19 to housing 1. The plate and the cover 18 are pierced for the passage of an actuating spindle 20 forming a steering control member comprising a rim 21 for the ball bearing 17, two cylindrical ridges 22 on both sides of the rim 21 for a ring seal 23, and a retaining element 24, all fitted in the ring or plate 15 and in the cover 18 respectively. An outside end 25 is adapted to receive means for connection to the transmission from a steering wheel, and an internal part 26 is formed with helical grooving 27 and received in bore 10 of the piston 3 and in screwthreaded engagement with a conventional recirculating ball device in the nut 12.

Stacked in the chamber 11, and starting from the shoulder 11a above defined, are an annular plate 28, a discoid ring 28, an annular plate 30 which has an axial collar 31 adjacent the inside surface of the enlarged portion 11, two halves 32 of a ball race, and an annular nut 33 which presses these items against the base of the chamber 11. Through the agency of the rolling bearing comprising the ball race 32, the nut 12 is rotatably mounted in the enlarged portion or recess bounded by the parts mentioned and the collar 31; the nut 12 engages conventionally with groove 27 of the spindle by means of the recirculating balls 34. The nut 12 extends by way of its inside axial surface into a collar or sleeve 35 having external ribbing 36 between which are defined splines (FIGS. 2 and 3) and extending with clearance through the annular plates 28, 30, the externally cylindrical free end of the element 35 engaging in a shoulder seat of the bore 10 with the interposition of an O-ring seal 37.

The discoid ring 29 and the collar 35, on the one hand, and the two annular plates or discs 28, 30, on the other hand, bound a discoid or disc-shaped chamber of the valve device, such chamber being isolated from the adjacent chambers fluid-wise by means of the seal 37 and of a seal 38 disposed between the collar 31 and the nut 12 and by means of seals 39, 40 disposed between the discs 28 and 30 and the surfaces of the enlarged portion 11. In other words, the disc-shaped chamber is coaxial with the spindle, and is defined in an assembly which is rigidly fixed with the piston 3.

The inside surface of the discoid ring 29 consists of two sets, each consisting of three cylindrical surfaces alternating peripherally the cylindrical surface of each set having a different radii, the surface having the larger radius bearing the reference 41 and the surface having the smaller radius bearing the reference 42. Disposed in the discoid valve chamber is a star-shaped valve rotor 43 having a central annular portion with a central orifice which is so grooved and splined as to engage in rotation with the ribs 36 of the sleeve 35 integral with valve nut device 12. The star-shaped rotor has two sets of arms 44, 45 which project radially from its central portion. Arms 44 and 45 are alternatively disposed around the central portion so that the extremities of arms 44 slidably and sealingly cooperate with the cylindrical surfaces 41 of greater radius, whereas the extremities of arms 45 slidably and sealingly cooperate with the cylindrical surfaces 42 of smaller radius. Therefore, the discoid chamber is divided into two sets of three chambers 46, 47, which are alternatively disposed around the central portion, each chamber 46, 47 being bounded by the inner surface of the discoid chamber, by the edge surfaces of two adjacent arms 44 and 45. Each of the chambers 47 communicates with an annular groove 49 defined in the face of the disc 28 contacting the annular shoulder 11a of the enlarged portion of the bore, by way of respective ports 48 which extend in the wall of plate 28. Groove 49 is insulated fluidwise, by means of seals 39. A duct 50, which longitudinally extends through the piston 3, communicates groove 49 with the work chamber 5 of the steering box.

Similarly, three passages 51 extend through the disc 30 and collar 31, and open into an annular space defined by the clearance between the nut 12 and the elements 31, 32, 33 to provide for fluid communication between the three chambers 46 and the work chamber 6 of the steering box.

The disc 30 has three ports 53 registering with the arms 44 of greater radius, when in the normal position and communicating via ducts 54, defined in said disc, with an annular groove 55 defined in the outside surface of the collar 31. The groove 55 communicates with a connection 57 which is contrived in the outside surface of the housing 1, by means of ducts which are partly visible at 56, when considering FIG. 3.

When mounted on a vehicle, a tube is connected to connection 57 for communicating the latter with the high pressure side of a pressure fluid supply.

The discs 28, 30 also have a respective port 58 which is opposite the rotor arms 45 when the device is in its normal position and from which extend radial grooves 59. The radial grooves terminate into annular grooves 60 defined in the outer edges of the discs 28, 30. The piston is formed with a radial bore 61 via which the grooves 60 communicate with the outside surface of the piston 3 to convey fluid to an exit spigot 62 contrived on the outside surface of the box 1. To this end, the cooperating surfaces of the cylinder 2 and piston 3 are formed with a pair of aligned longitudinal grooves 63 which overlap one another in all the operating positions of the steering gear and which communicate the radial bore 61 and exit spigot 62 respectively. Exit spigot 62 is connected to the low pressure side of the pressure fluid supply.

The star-shaped rotor 43 is not shown in FIG. 1, in order not to overload the drawings, and it has been assumed that the various ducts described are in the same plane of the drawing, to facilitate the description. However, the actual positions of the various ducts around the axis of the system, are clearly apparent in FIG. 3.

Figure 2:
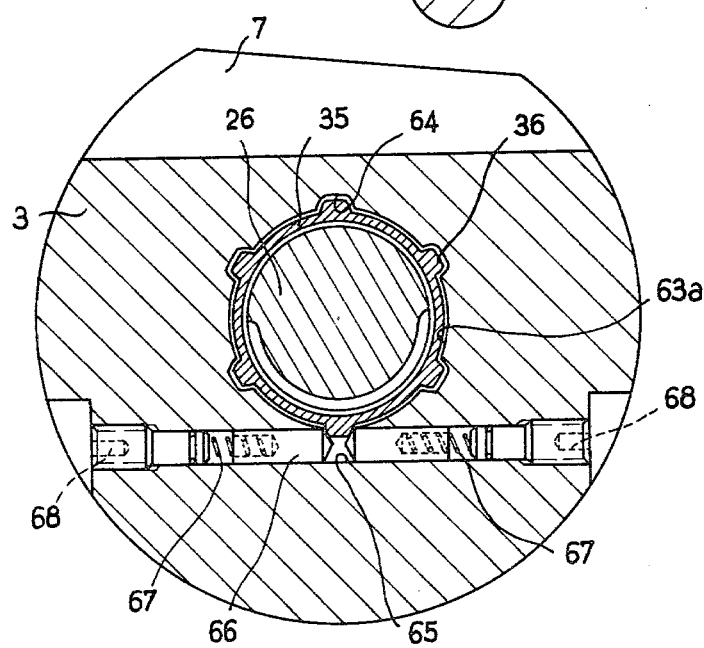
FIG. 2 is a cross-section along line II—II of FIG. 1, showing the self-centering feature of the valve.

Considering now FIG. 2 more in details, it is seen that the end of the sleeve 35 cooperates with an intermediate cylindrical portion 63a disposed between bore 10 and large diameter portion 11. The inner surface of intermediate portion 63a comprises longitudinal grooves 64 in which are received the external ribs 36 of the sleeve portion, with a circumferential clearance being allowed between ribs 36 and grooves 64 receiving them, said clearance corresponding to the amount of relative rotation possible between the nut 12 and the piston 3, i.e. between the rotor 43 and the discs 28, 30 therearound.

In the piston 3 is formed a transverse bore 65 which is substantially tangential to the outside surface of the sleeve 35 in the angular position corresponding to one of the sets of ribs and grooves 36, 64. In the bore 65 are slidably mounted two actuating pistons 66 disposed on each side of the rib portion extending into that section of the bore 65. The pistons 66 are biased towards one another by means of respective helical springs 67 which are disposed in compression in the bore 65 and which bear on screw threaded plugs 68. The nature of the construction is such that, assuming the forces of the two springs to be equal, the device will centre itself automatically.

The general operation of the valve device is as follows:

The rotor 43 is operated by relative movement between the nut 12 and the piston 3 when the same is displaced by the spindle 20, which starts to be operated to turn the wheels. Therefore, the arms of the rotor are displaced with respect to the openings which normally register therewith to communicate the high pressure from the pressure fluid supply to one set of chambers 46, 47 that is to one of the work chambers, and to communicate low pressure to the other set of chambers 46, 47 that is to the other of the work chambers. Therefore, the pressure difference between work chambers of the steering box, provides for a power assist to the turning of the wheels of the vehicle. When the force being applied to the steering wheel ceases, the springs 67 return the system to its normal central position.

Figure 4:
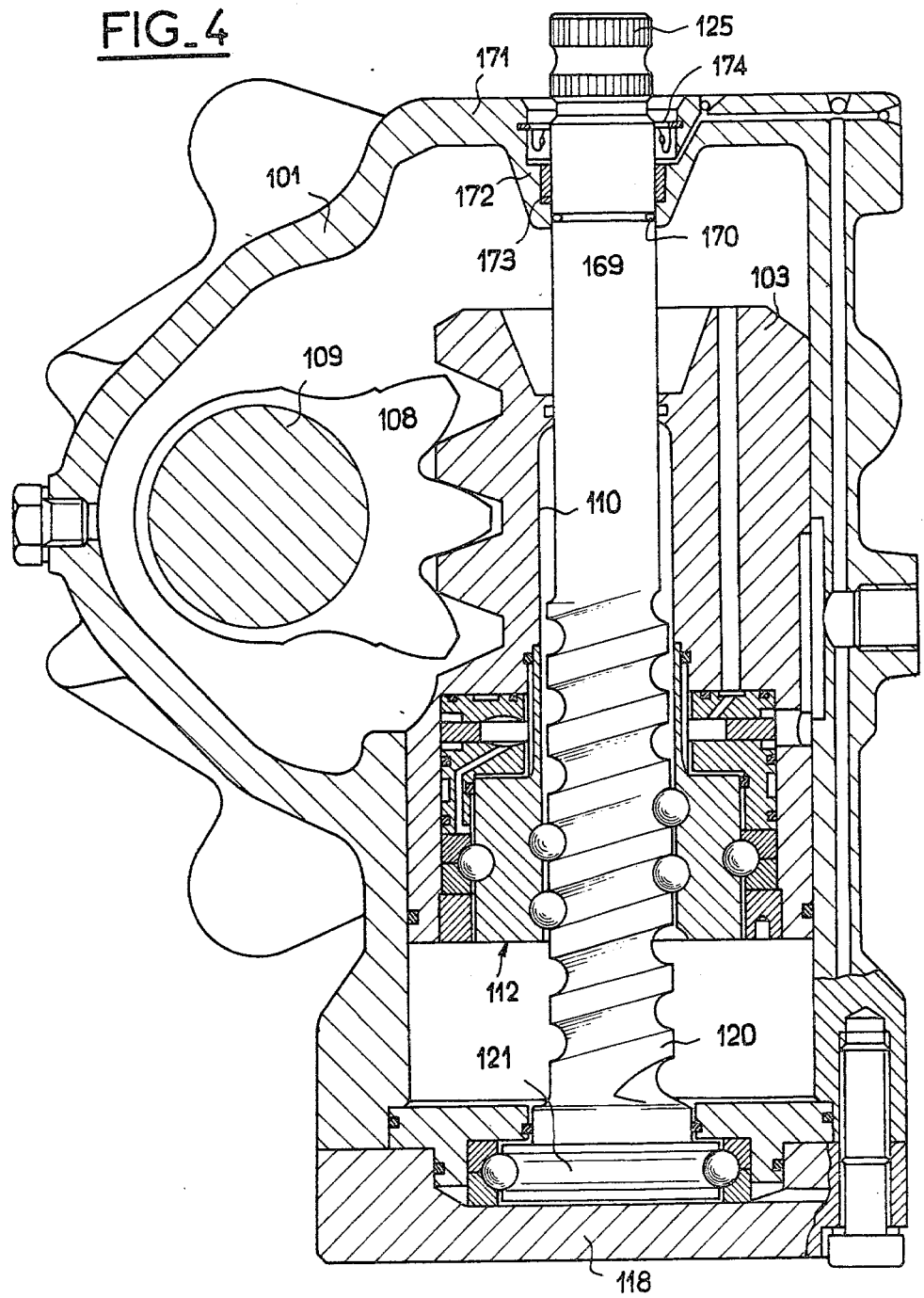
FIG. 4 is a view in axial section similar to FIG. 1 of a variant in which the coupling end of the spindle extends through the opposite side of the box.

In a second embodiment of the invention shown on FIG. 4 of the drawings, there is proposed a power steering mechanism wherein the space between the shaft 9 and the spindle end 25 can be further reduced. This second embodiment differs from the first one which has been previously described merely in that the spindle ends extends through the opposite side of the box 1. Therefore, in the description to follow and in FIG. 4 of the drawings, elements similar to those of FIG. 1 will be designated by the same numerical reference, augmented by 100. The spindle 120 terminates at the bottom in the bearing rim 121 and the cover 118 does not comprise a central hole. Also, bore 110 of piston 103 is continuous and has the spindle extension 169 extending through it, a hermetic closure being provided by means of a seal 170. The spindle end 169 extends through end 171 of box 101 by way of a collar 172 having a bearing ring 173 and a retaining element 174 and terminates in grooving or splining 125 which is adapted to be connected to the transmission extending to the steering wheel.

What we claim is:

1. Power steering mechanism for a vehicle comprising a housing defining a cavity in which is rotatably mounted a rotary steering control member, a driving piston connected to a member in the steering gear of the vehicle, the piston separating two pressure chambers of the housing, said driving piston also including a bore having an open end through which axially extends a screwthreaded spindle of the rotary steering control member, characterized in that a disc-shaped distributing chamber is defined in said driving piston, said chamber being coaxial with the spindle and being formed by a surface having alternating large and small radii, said piston supporting a nut element in screwthreaded engagement with said screwthreaded spindle, said nut element being prevented to move axially with respect to the piston, and allowed to rotate within a limited angular range, a star-shaped rotor comprising a central portion from which extends a plurality of radial arms rotatably mounted in the disc-shaped member; said plurality of radial arms sealingly and slidably engaging and cooperating with said alternating large and small radii surface to form a first set and a second set of distributing chambers respectively connected to the first and second pressure chambers of the housing, said star-shaped rotor being connected in rotation with the nut element, fluid inlet and outlet passages respectively connectible to the high pressure side and the low pressure side of a pressure source being provided in said driving piston to communicate with the disc-shaped chamber through respective openings, said openings cooperating with the arms of the rotor to control distribution of the fluid pressure to the first and second pressure chambers as a function of the relative angular position of the piston and rotor.

2. Power steering mechanism according to claim 1, characterized in that the open end of the bore comprises an enlarged portion defining a shoulder, the disc-shaped chamber being formed by the inner space defined in an arrangement comprised of two annular plates and an annular ring between the two plates, said arrangement being fitted in the enlarged portion so that one of the plates is in abutment with said shoulder, the nut element being mounted in said enlarged portion and having one sleeve extension axially projecting in said disc-shaped chamber, said extension being rotatably connected to the star-shaped rotor.

3. Power steering mechanism according to claim 2 characterized in that the outside surface of the sleeve extension comprises splines and ribs, said ribs engaging corresponding grooves in the star-shaped rotor to provide for the rotating connection between the nut element and the rotor.

4. Power steering mechanism according to claim 3, characterized in that the ribs of the sleeve extension further cooperate with grooves defined in the inner surface of the bore to allow the rotation between the nut element and the driving piston within said limited predetermined range.

5. Power steering mechanism according to anyone of the claims 3 or 4, characterized in that the piston comprises a transverse bore which is tangential to the outside surface of the sleeve, in an angular position of one of said ribs so that said rib radially projects in said transverse bore, two driving pistons being slidably disposed in said transverse bore on each side of the projecting rib, each of said piston being resiliently biased so as to engage a corresponding side of the rib, for self-centering of the valve device in its normal position.

* * * * *